US011804902B2

(12) United States Patent
Hall, Jr. et al.

(10) Patent No.: US 11,804,902 B2
(45) Date of Patent: Oct. 31, 2023

(54) OPTICAL LINE TERMINAL CONFIGURED TO OPERATE WITH OPTICAL NETWORK TERMINALS THAT REQUIRE DIFFERENT SETS OF OMCI PARAMETERS

(71) Applicant: Adtran, Inc., Huntsville, AL (US)

(72) Inventors: Orlyn Craye Hall, Jr., Huntsville, AL (US); Andrew Littleton, Huntsville, AL (US); Josh Matthew Horton, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 87 days.

(21) Appl. No.: 17/585,721

(22) Filed: Jan. 27, 2022

(65) Prior Publication Data

US 2023/0299852 A1 Sep. 21, 2023

(51) Int. Cl.
*H04B 10/27* (2013.01)

(52) U.S. Cl.
CPC ................... *H04B 10/27* (2013.01)

(58) Field of Classification Search
CPC ..................................... H04B 10/27
USPC ............................................... 398/58
See application file for complete search history.

(56) References Cited

U.S. PATENT DOCUMENTS

| 9,270,480 | B1* | 2/2016 | Som de Cerff | H04L 41/344 |
| 2008/0037986 | A1* | 2/2008 | Effenberger | H04L 41/0233 398/58 |
| 2010/0104285 | A1* | 4/2010 | Shaffer | H04B 10/0775 398/66 |
| 2018/0212705 | A1* | 7/2018 | Gao | H04L 9/40 |
| 2023/0188420 | A1* | 6/2023 | Tan | G06F 9/44505 713/1 |

* cited by examiner

*Primary Examiner* — Dalzid E Singh

(74) *Attorney, Agent, or Firm* — Fish & Richardson P.C.

(57) ABSTRACT

Methods, systems, and apparatus, including computer programs encoded on a computer storage medium, implementing an Optical Line Terminal (OLT) that successfully communicates with Optical Network Terminals having various ONT Management Control Interface (OMCI) parameter configurations. The OLT is configured to perform operations including determining that two different sets of OMCI parameters are required to communicate with two different ONTs and registering both of the two different ONTs using two different sets of OMCI parameters. The registration includes configuring communications with a first ONT using a first set of OMCI parameters and configuring communications with a second ONT using a second set of OMCI parameters that differs from the first set of OMCI parameters. After completing the registering, the OLT exchanges network traffic with each of the two different ONTs according to their respective configurations.

20 Claims, 5 Drawing Sheets

OPTICAL LINE TERMINAL CONFIGURED TO OPERATE WITH OPTICAL NETWORK TERMINALS THAT REQUIRE DIFFERENT SETS OF OMCI PARAMETERS

BACKGROUND

This specification relates to an Optical Line Terminal. As user data consumption/utilization increases, network operators are looking for ways to expand the types of telecommunications devices that their networks can support. However, equipment from different manufacturers are typically inoperable due to differences in how Optical Network Units are provisioned.

SUMMARY

In general, one innovative aspect of the subject matter described in this specification can be embodied in one or more methods of enabling communications between an Optical Line Terminal ("OLT") and different Optical Network Units (ONTs) having different ONT Management Control Interface configurations. Methods can include transmitting, by an OLT, a discovery message that triggers a response from ONTs that (i) are connected to a Passive Optical Network (PON), but (ii) are not registered with the OLT; receiving, from two different ONTs connected to the PON, a response to the discovery message that contains one or more identifiers of the ONT; determining, by the OLT and based on the one or more identifiers of the two different ONTs, that two different sets of ONT Management Control Interface (OMCI) parameters are required to communicate with the two different ONTs; registering, by the OLT, both of the two different ONTs to communicate with the OLT using two different sets of OMCI parameters, including: configuring, by the OLT and over the PON, communications between the OLT and a first ONT among the two different ONTs using a first set of OMCI parameters; and configuring, by the OLT and over the PON, communications between the OLT and a second ONT among the two different ONTs using a second set of OMCI parameters that differs from the first set of OMCI parameters; and after completing the registering, transmitting and receiving, by the OLT, network traffic to and from each of the two different ONTs according to their respective configurations.

These and other embodiments can each optionally include one or more of the following features. Methods can include generating multiple different sets of OMCI parameters for multiple different ONTs that require different sets of OMCI parameters to successfully communicate with the OLT; and storing, in a database accessible to the OLT, the multiple different sets of OMCI parameters, wherein each given set of OMCI parameters is keyed to one or more of (i) a source identifier specifying a source of ONTs that require the given set of OMCI parameters for successful communications or (ii) a model identifier specifying a model number of ONTs that require the given set of OMCI parameters for successful communications.

Methods can include monitoring communications between multiple different types of ONTs and OLTs that are successfully communicating. Generating multiple different sets of OMCI parameters comprises for each different type of ONT can include: determining, based on the monitored communications, one or more OMCI parameters that are required for successful communication with a particular type of ONT; and generating, for the particular type of ONT, an OMCI configuration that specifies the one or more parameters that are required for successful communication with the particular type of ONT.

Methods can include determining whether each OMCI configuration is required by multiple different models of ONTs provided by a same ONT source; and keying, in the database accessible to the OLT, the OMCI configuration based on the determination whether the OMCI configuration is required by multiple different models of ONTs provided by the same ONT source. The keying can include keying a first OMCI configuration to a first source identifier in response to the determination that the first OMCI configuration is required by multiple different models of ONTs provided by a first ONT source; and keying a second OMCI configuration to a model identifier of a particular ONT model, rather than a source identifier of the particular ONT model, in response to the determination that the second OMCI configuration is required by the particular ONT model, but not a different ONT model provided by the source of the particular ONT model.

Determining one or more OMCI parameters that are required for successful communication and operation with the particular type of ONT can include: determining whether a source name is required to be specified during OMCI provisioning to achieve a successful provisioning of the ONT to allow the data, voice and video services to operate with the particular type of ONT; determining whether a software version is required to be specified during OMCI provisioning to achieve a successful provisioning of the ONT to allow the data, voice and video services to operate with the particular type of ONT; determining whether a p-bit mapper is required during OMCI provisioning to achieve a successful provisioning of the ONT to allow the data, voice and video services to operate with the particular type of ONT; determining whether TR-156 support is required during OMCI provisioning to achieve a successful provisioning of the ONT to allow the data, voice and video services to operate with the particular type of ONT; and/or determining a Voice IP-Host ME setting that is required during OMCI provisioning to achieve a successful provisioning of the ONT to allow the data, voice and video services to operate with the particular type of ONT.

Methods can include determining whether a PLOAM messaging sequence of the OLT is required to be modified based on a determination of whether the ONT requires an Assign Alloc-ID PLOAM message at startup.

Methods can include for each responding ONT among the two different ONTs; determining, by the OLT and based on the one or more identifiers of the ONT, a source of the responding ONT; initiating, by the OLT and based on the source of the responding ONT, an OMCI state machine to manage configuration of communications between the OLT and the responding ONT.

Methods can include in response to determining that a source of the responding ONT differs from a source of the OLT, retrieving, from the database, the set of OMCI parameters that are keyed to the source of the responding ONT; and modifying the OMCI state machine based on the set of OMCI parameters that are keyed to the source of the responding ONT.

Methods can include in response to determining that (i) a source of the responding ONT differs from a source of the OLT and (ii) the database does not include a set of OMCI parameters for the responding ONT, enabling entry of a set of OMCI parameters for the responding ONT; and modifying the OMCI state machine based on the set of OMCI parameters input for the responding ONT.

Another innovative aspect of the subject matter described in this document can be embodied in an Optical Line Terminal ("OLT") that includes a Passive Optical Network ("PON") communications interface (or another communications interface); one or more data processing apparatus; and one or more memory devices. The one or more data processing apparatus are configured to execute instructions that cause the one or more data processing apparatus to perform operations including transmitting, by an OLT, a discovery message that triggers a response from ONTs that (i) are connected to a Passive Optical Network (PON), but (ii) are not registered with the OLT; receiving, from two different ONTs connected to the PON, a response to the discovery message that contains one or more identifiers of the ONT; determining, by the OLT and based on the one or more identifiers of the two different ONTs, that two different sets of ONT Management Control Interface (OMCI) parameters are required to communicate with the two different ONTs; registering, by the OLT, both of the two different ONTs to communicate with the OLT using two different sets of OMCI parameters, including: configuring, by the OLT and over the PON, communications between the OLT and a first ONT among the two different ONTs using a first set of OMCI parameters; and configuring, by the OLT and over the PON, communications between the OLT and a second ONT among the two different ONTs using a second set of OMCI parameters that differs from the first set of OMCI parameters; and after completing the registering, transmitting and receiving, by the OLT, network traffic to and from each of the two different ONTs according to their respective configurations.

These and other embodiments can each optionally include one or more of the following features. The operations can include generating multiple different sets of OMCI parameters for multiple different ONTs that require different sets of OMCI parameters to successfully communicate with the OLT; and storing, in a database accessible to the OLT, the multiple different sets of OMCI parameters, wherein each given set of OMCI parameters is keyed to one or more of (i) a source identifier specifying a source of ONTs that require the given set of OMCI parameters for successful communications or (ii) a model identifier specifying a model number of ONTs that require the given set of OMCI parameters for successful communications.

The operations can include monitoring communications between multiple different types of ONTs and OLTs that are successfully communicating. Generating multiple different sets of OMCI parameters comprises for each different type of ONT can include: determining, based on the monitored communications, one or more OMCI parameters that are required for successful communication with a particular type of ONT; and generating, for the particular type of ONT, an OMCI configuration that specifies the one or more parameters that are required for successful communication with the particular type of ONT.

The operations can include determining whether each OMCI configuration is required by multiple different models of ONTs provided by a same ONT source; and keying, in the database accessible to the OLT, the OMCI configuration based on the determination whether the OMCI configuration is required by multiple different models of ONTs provided by the same ONT source. The keying can include keying a first OMCI configuration to a first source identifier in response to the determination that the first OMCI configuration is required by multiple different models of ONTs provided by a first ONT source; and keying a second OMCI configuration to a model identifier of a particular ONT model, rather than a source identifier of the particular ONT model, in response to the determination that the second OMCI configuration is required by the particular ONT model, but not a different ONT model provided by the source of the particular ONT model.

Determining one or more OMCI parameters that are required for successful communication and operation with the particular type of ONT can include: determining whether a source name is required to be specified during OMCI provisioning to achieve a successful provisioning of the ONT to allow the data, voice and video services to operate with the particular type of ONT; determining whether a software version is required to be specified during OMCI provisioning to achieve a successful provisioning of the ONT to allow the data, voice and video services to operate with the particular type of ONT; determining whether a p-bit mapper is required during OMCI provisioning to achieve a successful provisioning of the ONT to allow the data, voice and video services to operate with the particular type of ONT; determining whether TR-156 support is required during OMCI provisioning to achieve a successful provisioning of the ONT to allow the data, voice and video services to operate with the particular type of ONT; and/or determining a Voice IP-Host ME setting that is required during OMCI provisioning to achieve a successful provisioning of the ONT to allow the data, voice and video services to operate with the particular type of ONT.

The operations can include determining whether a PLOAM messaging sequence of the OLT is required to be modified based on a determination of whether the ONT requires an Assign Alloc-ID PLOAM message at startup.

The operations can include for each responding ONT among the two different ONTs; determining, by the OLT and based on the one or more identifiers of the ONT, a source of the responding ONT; initiating, by the OLT and based on the source of the responding ONT, an OMCI state machine to manage configuration of communications between the OLT and the responding ONT.

The operations can include in response to determining that a source of the responding ONT differs from a source of the OLT, retrieving, from the database, the set of OMCI parameters that are keyed to the source of the responding ONT; and modifying the OMCI state machine based on the set of OMCI parameters that are keyed to the source of the responding ONT.

The operations can include in response to determining that (i) a source of the responding ONT differs from a source of the OLT and (ii) the database does not include a set of OMCI parameters for the responding ONT, enabling entry of a set of OMCI parameters for the responding ONT; and modifying the OMCI state machine based on the set of OMCI parameters input for the responding ONT.

Another innovative aspect of the subject matter described in this document can be embodied in one or more non-transitory computer readable medium storing instructions that, when executed by one or more data processing apparatus, cause the one or more data processing apparatus to perform operations including transmitting, by an OLT, a discovery message that triggers a response from ONTs that (i) are connected to a Passive Optical Network (PON), but (ii) are not registered with the OLT; receiving, from two different ONTs connected to the PON, a response to the discovery message that contains one or more identifiers of the ONT; determining, by the OLT and based on the one or more identifiers of the two different ONTs, that two different sets of ONT Management Control Interface (OMCI) parameters are required to communicate with the two different ONTs; registering, by the OLT, both of the two different ONTs to communicate with the OLT using two different sets of OMCI parameters, including: configuring, by the OLT and over the PON, communications between the OLT and a first ONT among the two different ONTs using a first set of OMCI parameters; and configuring, by the OLT and over the PON, communications between the OLT and a second ONT among the two different ONTs using a second set of OMCI parameters that differs from the first set of OMCI parameters; and after completing the registering, transmitting and receiving, by the OLT, network traffic to and from each of the two different ONTs according to their respective configurations.

These and other embodiments can each optionally include one or more of the following features. The operations can include generating multiple different sets of OMCI parameters for multiple different ONTs that require different sets of OMCI parameters to successfully communicate with the OLT; and storing, in a database accessible to the OLT, the multiple different sets of OMCI parameters, wherein each given set of OMCI parameters is keyed to one or more of (i) a source identifier specifying a source of ONTs that require the given set of OMCI parameters for successful communications or (ii) a model identifier specifying a model number of ONTs that require the given set of OMCI parameters for successful communications.

The operations can include monitoring communications between multiple different types of ONTs and OLTs that are successfully communicating. Generating multiple different sets of OMCI parameters comprises for each different type of ONT can include: determining, based on the monitored communications, one or more OMCI parameters that are required for successful communication with a particular type of ONT; and generating, for the particular type of ONT, an OMCI configuration that specifies the one or more parameters that are required for successful communication with the particular type of ONT.

The operations can include determining whether each OMCI configuration is required by multiple different models of ONTs provided by a same ONT source; and keying, in the database accessible to the OLT, the OMCI configuration based on the determination whether the OMCI configuration is required by multiple different models of ONTs provided by the same ONT source. The keying can include keying a first OMCI configuration to a first source identifier in response to the determination that the first OMCI configuration is required by multiple different models of ONTs provided by a first ONT source; and keying a second OMCI configuration to a model identifier of a particular ONT model, rather than a source identifier of the particular ONT model, in response to the determination that the second OMCI configuration is required by the particular ONT model, but not a different ONT model provided by the source of the particular ONT model.

Determining one or more OMCI parameters that are required for successful communication and operation with the particular type of ONT can include: determining whether a source name is required to be specified during OMCI provisioning to achieve a successful provisioning of the ONT to allow the data, voice and video services to operate with the particular type of ONT; determining whether a software version is required to be specified during OMCI provisioning to achieve a successful provisioning of the ONT to allow the data, voice and video services to operate with the particular type of ONT; determining whether a p-bit mapper is required during OMCI provisioning to achieve a successful provisioning of the ONT to allow the data, voice and video services to operate with the particular type of ONT; determining whether TR-156 support is required during OMCI provisioning to achieve a successful provisioning of the ONT to allow the data, voice and video services to operate with the particular type of ONT; and/or determining a Voice IP-Host ME setting that is required during OMCI provisioning to achieve a successful provisioning of the ONT to allow the data, voice and video services to operate with the particular type of ONT.

The operations can include determining whether a PLOAM messaging sequence of the OLT is required to be modified based on a determination of whether the ONT requires an Assign Alloc-ID PLOAM message at startup.

The operations can include for each responding ONT among the two different ONTs; determining, by the OLT and based on the one or more identifiers of the ONT, a source of the responding ONT; initiating, by the OLT and based on the source of the responding ONT, an OMCI state machine to manage configuration of communications between the OLT and the responding ONT.

The operations can include in response to determining that a source of the responding ONT differs from a source of the OLT, retrieving, from the database, the set of OMCI parameters that are keyed to the source of the responding ONT; and modifying the OMCI state machine based on the set of OMCI parameters that are keyed to the source of the responding ONT.

The operations can include in response to determining that (i) a source of the responding ONT differs from a source of the OLT and (ii) the database does not include a set of OMCI parameters for the responding ONT, enabling entry of a set of OMCI parameters for the responding ONT; and modifying the OMCI state machine based on the set of OMCI parameters input for the responding ONT.

The subject matter described in this document can be implemented so as to realize one or more of the following advantages. An OLT manufactured by one entity (also referred to as a source) can be used to communicate with and/or configure ONTs manufactured by other entities. For example, an OLT configured as described throughout this document can identify multiple different types of ONTs that are present on a same PON as the OLT, and modify, on a per-ONT basis, the OMCI parameters used to provision (e.g., configure or otherwise communicate with) the different types of ONTs. This is an improvement over conventional OLTs, which are configured to use a single set of OMCI parameters, and are therefore, unable to provision (e.g., configure or otherwise communicate with) ONTs that do not use the same single set of OMCI parameters as the OLT. This prevents traditional OLTs from communicating with different types of ONTs.

The OLTs and methods discussed herein also prevent network failures stemming from non-standard configurations of ONTs, or even misconfigurations, thereby providing a more robust communications network that is capable of achieving effective communications, even when a particular ONT on the same PON as the OLT has been configured to use different OMCI parameters than the OLT and/or other ONTs on the PON. In these situations, the OMCI parameters required to provision (e.g., configure or otherwise communicate with) the ONT can be detected (or otherwise obtained), and the OLT can use those different OMCI parameters to facilitate communication with the particular ONT when that particular ONT is detected on the PON. Meanwhile, the OLT can use another set (or other sets) of OMCI parameters to provision (e.g., configure or otherwise communicate with) another ONT (or multiple ONTs) that is also on the PON. This is an improvement over conventional ONTs, which would be unable to utilize multiple different sets of OMCI parameters to provision multiple different ONTs on the same PON. The ability to use a single OLT to support different ONTs (e.g., from different manufacturers and/or that utilize non-compatible sets of OMCI parameters) on a same PON enables the creation of a heterogeneous PON that can support various types of ONTs, thereby enabling the addition of new ONTs to a network that may have been deployed using legacy ONTs that are still in use by existing network users.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
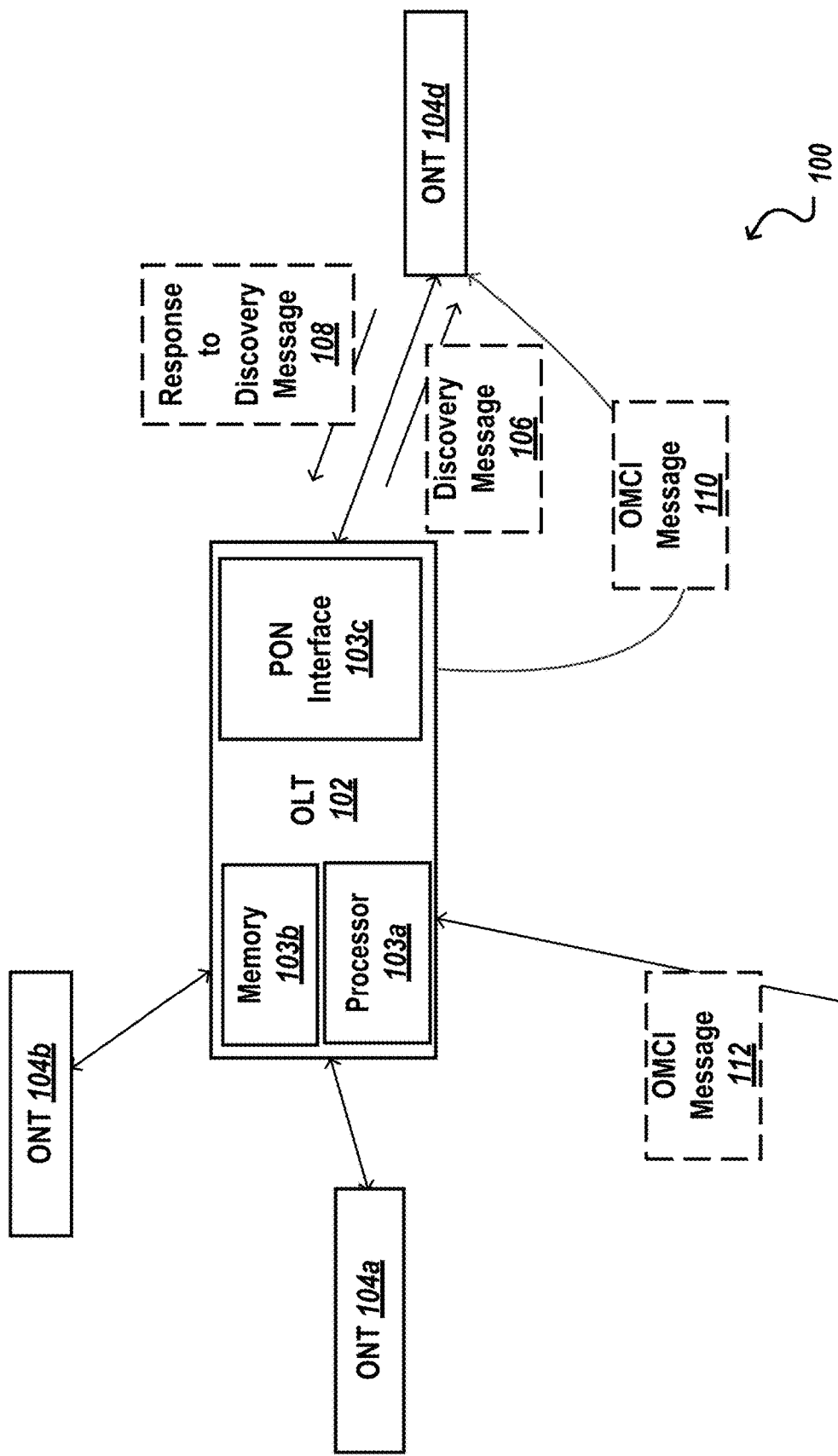
FIG. 1 is a block diagram of an example Passive Optical Network.

Communications networks continue to evolve as online access is made available to more of the population. For example, faster data speeds are being offered to end users as newer equipment is deployed in the network. However, not every end user is subscribing to the highest data rates offered, meaning that some end users may not need the same equipment as other end users who require a higher data rate. Even in situations where different end users subscribe to the highest data rates (or the same data rates), it is becoming more common for new equipment to be deployed on a same Passive Optical Network (PON), as legacy equipment.

For example, one end user may have received their Optical Network Terminal (ONT) from a network operator several years ago, whereas that end user's neighbor may have just signed up for service with the network operator, and received a newer ONT. In another example, a user may move an ONT from one PON to another PON without the knowledge that the other ONTs on the new PON differ from the user's ONT, or that their ONT is incompatible with the Optical Line Terminal (OLT) servicing the new PON. More specifically, and as described in more detail below, the ONT Management Control Interface (OMCI) parameters required to interface with and/or provision (e.g., configure and/or communicate with) different types of ONTs (e.g., different models or from different ONT sources) on a PON can vary, but conventional OLTs have not been capable of adjusting their OMCI parameters on the fly (e.g., without taking the OLT offline) to support the addition of different types of ONTs to the PON. This has meant that the conventional OLTs could not provision a new ONT that is added to the PON without disrupting service to other end users (e.g., by taking the network offline).

The ONTs and methods discussed herein provide improvements over conventional OLTs because they provide for a more robust network environment in which different types of ONTs (e.g., that use different sets of OMCI parameters) can be added and/or removed from the PON without interrupting network communications between the OLT and other ONTs. The OLTs and methods described below also enable the continued expansion of a PON (e.g., to new users) using newer equipment that may not have been originally supported by the OLT that services the PON. Furthermore, these OLTs and methods prevent network failures or other communications problems that can occur when ONTs are configured to use a different set of OMCI parameters than the OLT was originally provisioned to use. More specifically, the ability to configure the OLT to use different sets of OMCI parameters to interact with different types of ONTs (e.g., on a per ONT basis), thereby enabling multiple different types of ONTs to be simultaneously serviced by the same OLT (e.g., without taking the OLT offline, which would disrupt network communications), provides more network flexibility and reliability.

As described in more detail below, the OLTs and methods discussed herein are configured to modify, on a per-ONT basis, the set of OMCI parameters used to interact with (e.g., configure or otherwise communicate with) the ONTs that are detected on the PON serviced by the OLT. In some implementations, the OLT receives one or more identifiers of a given ONT, which can be used to identify a source and/or a model (or other attributes) of the ONT. The OLT can use the one or more identifiers to determine that the given ONT requires the OLT to use a particular set of OMCI parameters that differs from one or more sets of OMCI parameters used to interact with other ONTs on the PON. The OLT can then use the particular set of OMCI parameters to interact with the given ONT, while continuing to use other sets of OMCI parameters to interact with other ONTs on the PON, and without taking the OLT offline for reconfiguration. For example, the OLT can use the particular set of OMCI parameters to register the given ONT with the OLT, which can include configuring the specifics of how the OLT and the ONT will communicate over the PON. After the ONT is registered, the OLT can transmit/receive network traffic to/from the ONT according to the configuration. The OLT can also continue to interact with the ONT using the particular OMCI parameters to continue to manage operation of the ONT (e.g., facilitate fault management, performance management, and security management of the ONT). Meanwhile, the OLT can use different sets of OMCI parameters to configure other ONTs on the PON and similarly manage the operation of the other ONTs on the PON.

FIG. 1 is a block diagram of an example passive optical network (PON) 100. The PON 100 includes an OLT 102. In some implementations, the OLT 102 includes one or more data processing apparatus (e.g., processor/CPU 103a), one or more memory devices 103b, and one or more communications interfaces (e.g., PON Interface 103c). For example, the OLT 102 can include a PON communications interface, including a port that connects the OLT 102 to a PON and communicatively couples the OLT 102 to ONT 104a, ONT 104b, ONT 104c, and ONT 104d. The ONTs are collectively referred to as ONTs 104. The ONTs 104 can include a combination of legacy ONTs (e.g., deployed in the PON 100 before a specified time) as well as newer ONTs (e.g., deployed in the PON 100 after the specified time).

The legacy ONTs may be ONTs that were manufactured for the supplier of the OLT 102. For example, the legacy ONTs may have been deployed with the OLT 102 as part of a complete communications system that was provided by a same telecommunications equipment manufacturer. As such, when the legacy ONTs and the OLT 102 were deployed, they were configured to communicate with each using a set of known commands and/or parameters (e.g., OMCI commands/parameters).

Meanwhile, the newer ONTs may be provided by a different equipment manufacturer than the OLT 102 and/or the legacy ONTs. For example, after deploying the OLT 102 and the legacy ONTs, the telecommunications service provider that operates/maintains the PON may add newer ONTs that were produced by a different manufacturer than the OLT 102 and/or the legacy ONTs. In this situation, incompatibilities between the newer ONTs and the OLT 102 and/or the legacy ONTs may disrupt the ability to communicate over the PON 100, thereby interrupting services provided to end users. For example, the newer ONTs may require an OLT to specify specific OMCI parameters in messages transmitted over the PON 100 to successfully provision the ONT to enable data, voice, and/or video services to function over the PON 100. Furthermore, these specific OMCI parameters may not be required to be used by the legacy ONTs, such that reconfiguring the OLT 102 to always use these specific OMCI parameters could prevent the OLT 102 from being able to successfully provision the legacy ONTs to enable data, voice, and/or video services.

To further illustrate, assume that the ONTs 104a, 104b, and 104c are legacy ONTs that were deployed with the OLT 102, and all require the same set of OMCI parameters to be used for successful provisioning of the legacy ONTs. Also assume that the ONT 104d is being added to the PON 100 while the OLT and ONTs 104a, 104b, and 104c are exchanging (e.g., transmitting and receiving) network traffic over the PON 100 to provide data, voice, and/or video services to end users over the PON 100 (i.e., after OMCI provisioning has already occurred between the OLT 102 and the ONTs 104a, 104b, and 104c). Further assume that the ONT 104d requires the OLT 102 to perform the OMCI provisioning using a different set of OMCI parameters than the set of OMCI parameters required by the ONTs 104a, 104b, and 104c. In this example, the OLT 102 is already configured to use the set of OMCI parameters required by the ONTs 104a, 104b, and 104c, which will prevent the OLT 102 from being able to successfully provision the ONT 104d. Further, taking the OLT 102 offline for reconfiguration will terminate the communications between the OLT 102 and the ONTs 104a, 104b, and 104c, which would then need to be reprovisioned.

As noted above, conventional OLTs have been static in their use of OMCI parameters (e.g., pre-coded in firmware), such that ONTs that use different sets of OMCI parameters could not be deployed with conventional OLTs for the reasons outlined above, and online (e.g., while network traffic is exchanged between the ONTs and the OLT) modification of the OMCI parameters used by the OLTs was not possible. As described in more detail below, this specification discusses techniques that can be used to implement a flexible OLT that is capable of modifying the OMCI parameters it uses without taking the OLT offline (i.e., while maintaining network communication exchanges with previously provisioned ONTs), and on a per-ONT basis. In other words, when the OLT 102 detects a new ONT on the PON 100, the OLT 102 can determine the set of OMCI parameters that the OLT is required to use to provision the ONT for data, voice, and video services, while continuing to maintain network communications with other ONTs that were previously provisioned for data, voice, and video services. This results in a more flexible network structure that does not sacrifice reliability (e.g., percentage uptime) for the added flexibility.

In operation, the OLT 102 can periodically send a discovery message 106 that invites any new ONTs to identify themselves to the OLT 102. For purposes of this example, assume that the ONT 104d has recently been connected to the PON 100, and that the ONT 104d receives the discovery message from the OLT 102. In this situation, the ONT 104d can generate a response to the discovery message 108 that includes, for example, factory programmed values for its vendor identifier (ID) and serial number. Other information could also be included, such as a model number or other information that could be used to identify the ONT 104d in a more specific manner. Alternatively, or additionally, the response 108 could trigger a message exchange between the OLT 102 and ONT 104d to exchange further messages that provided more details about the ONT 104d. In either situation, the OLT 102 can use the information about the ONT 104d to identify the set of OMCI parameters that the OLT 102 must use to successfully provision the ONT 104d for data, voice, and/or video services. In turn, the OLT 102 can proceed with the OMCI provisioning of the ONT 104d using the identified set of OMCI parameters (e.g., using OMCI message 110). Meanwhile, the OLT 102 can continue to exchange network traffic with the other ONTs 104a-104c and/or manage or monitor the other ONTs 104a-104c using the required set of OMCI parameters for those ONTs (e.g., using OMCI message 112), which differ from the set of OMCI parameters required to provision the ONT 104d.

Figure 2:
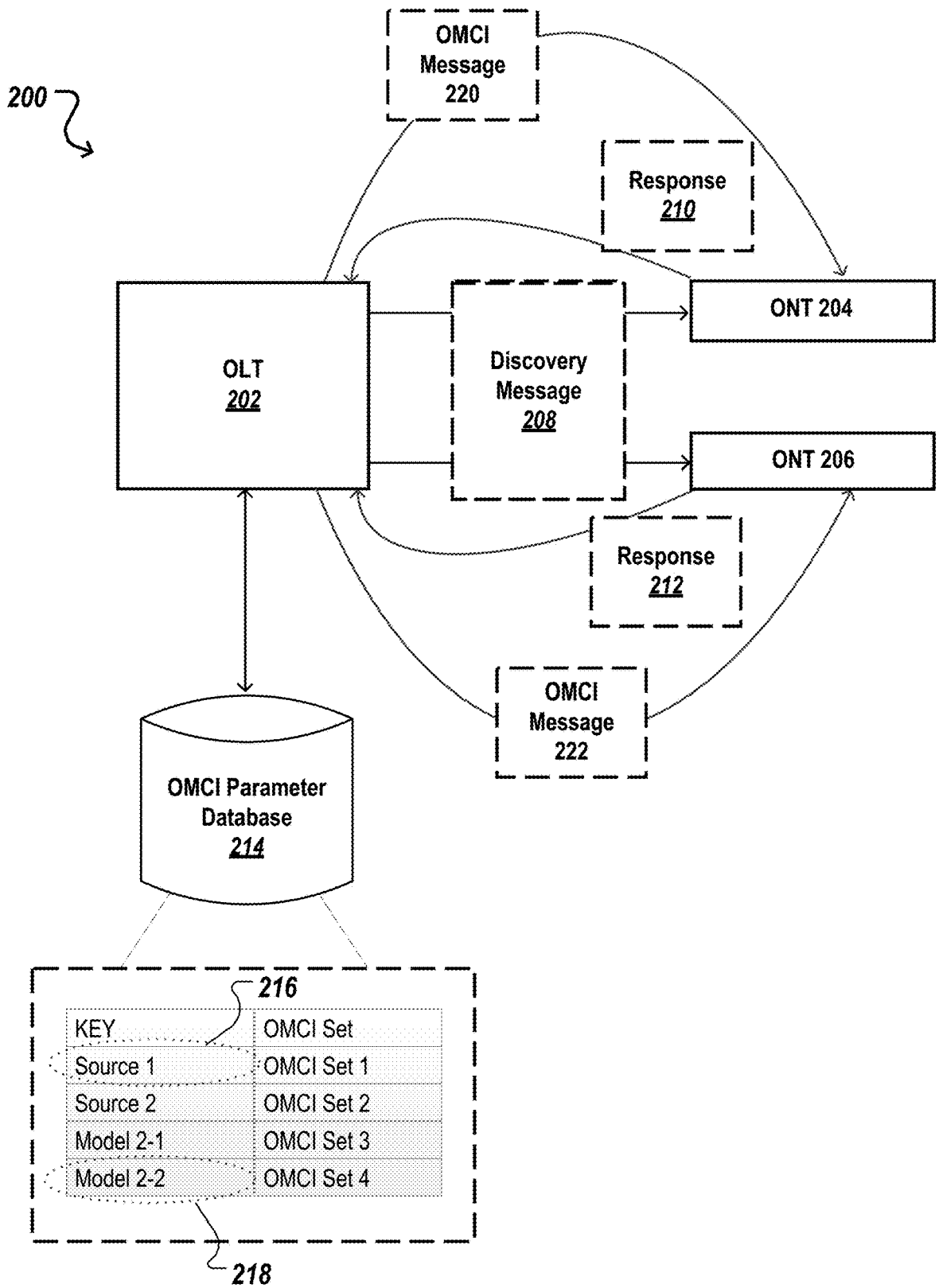
FIG. 2 is a block diagram of a data flow used to configure an OLT to provision different ONT using different sets of OMCI parameters.

FIG. 2 is a block diagram of a data flow used to configure an Optical Line Terminal (OLT 202) to provision different Optical Network Terminals (ONT 204 and ONT 206) using different sets of OMCI parameters. The data flow starts with the OLT 202 transmitting a discovery message 208 over a network (e.g., a PON). In some implementations, the discovery message 208 is standardized so that any ONT that is connected to the network can process the discovery message 208, and generate a response including information that can be used by the OLT 202 to initiate a provisioning process with the ONTs that respond. For example, as shown in FIG. 2, each of the ONT 204 and the ONT 206 receive the discovery message 208, and transmit responses. More specifically, ONT 204 transmits the response 210, while ONT 206 transmits the response 212.

The response 210 includes information identifying the ONT 204. For example, the response 210 can include a serial number of the ONT 204 and a vendor same (e.g., source) that supplies the ONT 204. In a particular example, the response 210 can specify that the vendor name is "Source 1," indicating that the ONT 204 is supplied by the manufacturer "Source 1." The response 210 can also include the serial number of the ONT 204. In some situations, the serial number can be used to identify the model of the ONT 204. For example, if a particular set of serial numbers for Source 1's ONTs are known to be assigned to be assigned to a particular ONT model provided by Source 1, the OLT 202 can use the serial number to identify the model corresponding to that serial number. In some situations, the model of the ONT 204 can be included in the response 210 (or a subsequent message sent to the OLT 202), such that the OLT 202 is not required to perform a model lookup using the serial number since the model of the ONT 204 is directly determinable from the response 210 itself.

The response 212 includes similar types of information as the response 210. For example, the response 212 can include a serial number of the ONT 206 and a vendor name (e.g., source identifier) that supplies the ONT 206. In a particular example, the response 212 can specify that the vendor name is "Source 2," indicating that the ONT 206 is supplied by the manufacturer "Source 2." For purposes of further discussion of this example, assume that the OLT 202 also identifies the model number of the ONT 206 (e.g., either using information included in the response 212, or information obtained from other messages transmitted to the OLT 202 by the ONT 206.

The data flow 200 proceeds with the OLT 202 determining that two different sets of OMCI parameters are required to communicate with the ONT 204 and the ONT 206. The OLT 202 can make this determination based on the information obtained about the ONT 204 and the ONT 206. For example, the OLT 202 can determine that the vendor name for the ONT 204 and the vendor name for the ONT 206 differ. Alternatively, or additionally, the OLT 202 can make the determination based on the ONT 204 and the ONT 206 being different models from a same vendor (or different vendors). For example, if the two models of the ONTs 204 and 206 require different sets of OCMI parameters to successfully complete the provisioning process with the OLT 202, then the OLT 202 can make the determination when it is determined that the ONT 204 and the ONT 206 are different models of ONTs.

The OLT 202 can utilize an OMCI Parameter Database 214 to lookup the vendor names and/or models identified for the ONTs 204 and 206, and identify the appropriate set of OMCI parameters to use for each of the ONTs 204 and 206. The data of the OMCI Parameter Database 214 can be stored in various types of memory devices. For example, the OMCI Parameter Database 214 can be stored in a separate storage device that is contacted or otherwise accessed when the OLT 202 receives a response from an ONT. In some situations, the OMCI Parameter Database can be stored in a volatile or non-volatile memory device within the OLT 202.

The OMCI Parameter Database 414 includes multiple sets of OMCI parameters that are each keyed to a corresponding source identifier or a corresponding model identifier. The corresponding source identifier for a given set of OMCI parameters specifies a source (e.g., manufacturer) of ONTs that require the given set OMCI parameters for successful communications, while the model identifier specifies a model number (e.g., an alphanumeric string) of ONTs that require the given set of OMCI parameters for successful communications.

Recall from the example above that the response 210 indicated that the ONT 204 is supplied by Source 1, and that the response 212 indicated that the ONT 206 is supplied by Source 2. Now assume that the OLT 202 determines that the model number of the ONT 206 is "Model 2-2." In this example, the OLT 202 can use the identified sources and model number to search the OMCI Parameter Database 214. More specifically, the OLT 202 can search the keys of the database 214 to determine whether any key matches the sources or model number. In the present example, the OLT 202 can determine that "Source 1" of ONT 204 matches the key entry 216, and that the model number "Model 2-2" matches the key entry 218 in the database 214.

When the OLT 202 identifies a matching key, the OLT 202 can then obtain the set of OMCI parameters that are indexed to that matching key, and use that set of OMCI parameters as the OMCI parameters for communicating with the ONT having the source identifier and/or model identifier that matched the corresponding key value. In the present example, the OLT 202 can obtain "OMCI Set 1" from the database 214 to be used for the ONT 204, and obtain "OMCI Set 4" from the database 214 to be used for the ONT 206.

Note that in this example, the OLT 202 can also determine that Source 2 of the ONT 206 also matches the key entry labeled "Source 2," such that two different key entries in the database could be identified as matching the information obtained for the ONT 206. When two or more key entries in the database 214 are matched by information for a single ONT, this has the potential to create uncertainty as to which set of OMCI parameters should be used for the ONT. In some situations, storage/indexing techniques similar to those discussed later with respect to FIG. 3 can be used to reduce the potential for multiple key entries to be identified as matching identification information for a particular ONT.

Additionally, or alternatively, a set of match rules can be defined to resolve any potential conflicts that arise based on multiple key entries being matched for a single ONT. The set of match rules can specify, for each given ONT types, how the OLT 202 should select the set of OMCI parameters for communications with a particular ONT when multiple different sets of OMCI parameters are indexed to key values matched by the identifier information for the particular ONT. For example, one match rule can specify that a more specific key match will win (e.g., be used over the other) in the case of two or more key matches. More specifically, if there is a key entry match for the source of the ONT and another key entry match for the model of the ONT, the model key match is selected because the model of the ONT is more specific key match since a source can provide multiple different ONT models. Another match rule can specify that the more specific set of OMCI parameters (e.g., a set having a higher number of required parameters) among the sets of OMCI parameters for the matched keys can be used when there are multiple key matches. Still another key match rule can instruct the OLT 202 to try using each set of OMCI parameters corresponding to the multiple matched keys until the appropriate set of OMCI parameters is identified (e.g., communications are successful). Other appropriate rules can also be specified to help resolve situations in which multiple keys may match the ONT identifiers.

The OLT 202 uses the sets of OMCI parameters that are obtained from the OMCI Parameter Database 214 to provision the ONTs 204 and 206 using OMCI messaging. For example, the OLT can use the OMCI parameters to generate OMCI messages that are used to configure the ONTs 204 and 206 for communications with the OLT 202. As illustrated by FIG. 2, OMCI message 220 is created by the OLT 202 and transmitted to the ONT 204, while a different OMCI message 222 is created by the OLT 204 and transmitted to the ONT 206. Each of the OMCI messages 220 and 222 can include the respective OMCI parameters that are required by each of the ONTs 204 and 206. Table 1 includes a set of potential OMCI parameters that the OLT 202 can use to provision the ONTs 204 and 206, depending on the requirements of the ONTs 204 and 306.

TABLE 1

| OMCI Parameter Type | Description |
| --- | --- |
| Vendor Name | ONT manufacturer name used to lookup parameters required by the ONT |

TABLE 1-continued

| OMCI Parameter Type | Description |
| --- | --- |
| Product Name | ONT Model Number or identifier used to lookup parameters required by the ONT |
| Required OLT Name | OLT name required for interoperability with the ONT |
| Software (SW) Version | OLT SW Version Required by the ONT |
| TR156 Data | Does the ONT expect untagged data/messaging to be tagged on the PON (Requires a different OMCI provisioning model) |
| TR156 Voice | Does the ONT expect untagged voice traffic/messaging to be tagged on the PON (Requires a different OMCI provisioning model) |
| TR156 Video | Does the ONT expect untagged video traffic/messaging to be tagged on the PON (Requires a different OMCI provisioning model) |
| Redundant SIP Agent | Does the ONT support the Redundant SIP Agent operation (Requires a non-default OMCI parameter to be sent in the associated OMCI message) |
| 802.1p Mapper | Does the ONT require the 802.1p Mapper Model for operation (Requires a different OMCI provisioning model) |
| Voice ME IP-Host | Required ME instance ID for the voice IP-Host provisioning (Requires a non-default OMCI parameter to be sent in the associated OMCI message) |
| Interop ME Attribute | Defines the OMCI ME Identifier and the location inside the message response that contains the ONT Model number or identifier |
| Voice PQ Priority | Required Voice VLAN Priority (Requires a non-default OMCI parameter to be sent in the associated OMCI message) |
| Send Alloc_ID For OMCI Port | Does the ONT allow the Alloc_ID PLOAM message for the OMCI GEM Port setup |

Figure 3:
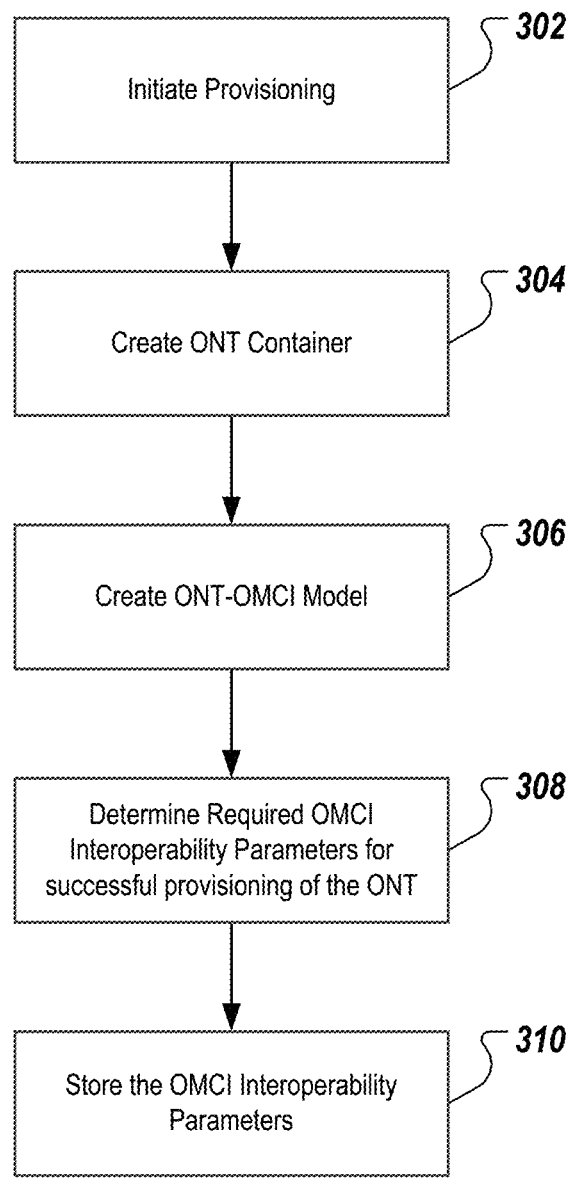
FIG. 3 is a flow chart of an example process of provisioning an OLT to communicate with different ONT that require different sets of OMCI parameters.

The process for determining the values of these parameters that are required to successfully provision a particular type of ONT are discussed with respect to FIG. 3. FIG. 3 is a flow chart of an example process 300 of provisioning an Optical Line Terminal (OLT) to communicate with different Optical Network Terminals (ONTs) with different sets of ONT Management Control Interface (OMCI) parameters. Operations of the process can be performed, for example, by the OLT 102 of FIG. 1 and/or one or more data processing apparatus. Operations of the process 300 can also be implemented as instructions that, upon execution by one or more data processing apparatus, cause the one or more data processing apparatus to perform the operation of the process 300.

The provisioning process is initiated (302). In some implementations, initiation of the provisioning process includes monitoring communications between multiple different types of ONTs and OLTs that are successfully communicating. For example, communications between an ONT and an OLT that was pre-configured to communicate with the ONT can be monitored to observe the OMCI parameters that the ONT includes in OMCI messages sent to the ONT. For example, a network monitor can be connected between the ONT and OLT to capture OMCI messages that are exchanged between the ONT and OLT, and those captured messages can be analyzed to determine the OMCI parameters that the OLT includes in OMCI messages sent to the ONT.

An ONT container is created (304). In some implementations, the ONT container is created based on a source identifier for the ONT. As discussed above, the source identifier can be a vendor name or another identifier that represents a source (e.g., manufacturer) of the ONT. The ONT container can be created to contain OMCI parameters that are the same for communicating with multiple different (e.g., some or all) ONTs having that source identifier. For example, assume that all ONTs from a particular manufacturer all use the same set of OMCI parameters for provisioning the ONTs. In this situation, the ONT container can contain those OMCI parameters, which could be applied to all ONTs from that manufacturer since there is no variation between the OMCI parameters required for an OLT to successfully communicate with any of the ONTs from that manufacturer.

In another example, if all of the ONTs from the particular manufacturer required the same subset (e.g., fewer than all) of OMCI parameters, that subset of OMCI parameters could be stored in the ONT container, and the subset of OMCI parameters could be varied for each model to accommodate the differences in OMCI parameters required by the different models from that particular manufacturer, as discussed below.

An ONT-OMCI model is created (306). The ONT-OMCI model can be created within the ONT container, and specifies the OMCI parameters that are required by a specific set of ONTs. For example, assume that the same set of OMCI parameters are required by all ONTs from a particular manufacturer. In this example, a single ONT-OMCI model can be created for all ONTs from the particular manufacturer, and that ONT-OMCI model can be used by the OLT for OMCI communications with any of the ONTs from that particular manufacturer.

In another example, assume that ONT-1 (a first model/type of ONT) from the particular manufacturer requires the OLT to use a first set of OMCI parameters, and ONT-2 (a second model/type of ONT) from the particular manufacturer. In this example, two different ONT-OMCI models can be created for the two different models/types of ONTs. More specifically, the ONT-OMCI model for ONT-1 can be created to specify the OMCI parameters that the OLT must use for successful communications with ONT-1, and the ONT-OMCI model for ONT-2 can be created to specify the OMCI parameters that the OLT must use for successful communications with ONT-2.

In some situations, each different ONT-OMCI model can be created to contain all of the OMCI parameters that are required for the OLT to successfully communicate with the ONT corresponding to the ONT-OMCI model. In other situations, a baseline set of OMCI parameters can be stored in the ONT container, and the ONT-OMCI model for each different model/type of ONT can specify the differences between the baseline set of OMCI parameters stored in the ONT container and the set of OMCI parameters that are required for the model/type of ONT corresponding to the ONT-OMCI model.

For example, assume that all of the ONTs from the particular manufacturer require the OLT to specify the OLT vendor name, but only a subset (e.g., fewer than all) of the ONTs from the particular manufacturer require the OLT software version to be specified in the OMCI messages sent by the OLT. In this example, the baseline ONT-OMCI model can specify that the OLT needs to use the vendor name in the OMCI messages sent to the ONT, and this baseline model can be stored in the ONT container to obtain the vendor name. Meanwhile, the ONT-OMCI model for the subset of the ONTs that require the OLT software version can specify that the baseline model should be obtained and augmented to add the OLT software version needed to communicate with those ONTs in the subset. In this way, redundant data does not need to be stored, and once a set of baseline requirements are known, they don't need to be modified on a per-ONT basis. Rather, only the differences between the baseline and a particular set of OMCI parameters required by a particular set of ONTs need to be defined in the ONT-OMCI model for that particular set of ONTs.

The set of OMCI Interoperability Parameters (OMCI parameters) required for successful provisioning of the different ONTs are determined (308). Determining the set of OMCI parameters required for successful provisioning of the different ONTs can include generating multiple different sets of OMCI parameters for multiple different ONTs that require different sets of OMCI parameters to successfully communicate with the OLT. In some implementations, the required OMCI parameters for each different ONT (e.g., different type or model of ONT) is determined based on the monitored communications discussed above. For example, for a particular type (e.g., from a particular vendor and/or having a particular model identifier), the monitored communications during OMCI provisioning can be analyzed to determine the OMCI parameters that are exchanged between the OLT and the ONT, and therefore, required for successful provisioning of the ONT to enable data, voice, and video services to operate with the particular type of ONT. In other words, the analysis reveals the values specified for each OMCI parameter that is exchanged during the monitored OMCI provisioning between the OLT and ONT pair that were pre-configured to communicate with each other. Using the one or more parameters, an OMCI configuration can be generated for the particular type of ONT. The OMCI configuration can specify the one or more OMCI parameters, and can be the basis of defining the ONT-OMCI model that was created for the particular type of ONT.

To determine the OMCI parameters that are required for successful communication with the particular type of ONT, the analysis of the monitored communications can include determining which of the parameters is used for each OLT/ONT pair that is monitored. For example, the analysis can include determining whether a source name is required to be specified by the OLT during OMCI provisioning to achieve a successful provisioning of the ONT to allow the data, voice and video services to operate with the particular type of ONT. The analysis can also include determining whether a software version (e.g., the OLT software version) is required to be specified during OMCI provisioning to achieve a successful provisioning of the ONT to allow the data, voice and video services to operate with the particular type of ONT. The analysis can also include determining whether a p-bit mapper is required during OMCI provisioning to achieve a successful provisioning of the ONT to allow the data, voice and video services to operate with the particular type of ONT. The analysis can also include determining whether TR-156 support is required during OMCI provisioning to achieve a successful provisioning of the ONT to allow the data, voice and video services to operate with the particular type of ONT. The analysis can also include determining a Voice IP-Host ME setting that is required during OMCI provisioning to achieve a successful provisioning of the ONT to allow the data, voice and video services to operate with the particular type of ONT.

In some implementations, the analysis can also include a determination of whether any changes to the initial discover message, which is a PLOAM (Physical Layer Operation Administration and Maintenance) message. Some manufacturer's implementation of the PLOAM messaging sequence sends an Assign Alloc-ID PLOAM message followed by a Configure Port-ID PLOAM message to instruct the ONT which GEM (GPON Encapsulation Method) Port to use for sending OMCI messages. Meanwhile, other manufacturer's implementation of the PLOAM messaging sequence do not provision the OMCI Port ID correctly on startup if the Assign Alloc-ID PLOAM message was sent for the OMCI GEM Port. In this situation, the ONT sends OMCI messages on a GEM Port that the OLT was not expecting and after a timeout the OLT restarts the ONT. To correct for this incompatibility and communication failure, a parameter can be added to the OMCI configuration for a particular ONT (or set of ONTs) to indicate whether or not the OLT should send the Assign Alloc ID message for the OMCI port. To facilitate the addition of this parameters to the OMCI configuration of a set of ONTs, the analysis of the communications between an OLT/ONT pair can include a determination of whether the OLT sends the Assign Alloc-ID PLOAM message at startup, e.g., in relationship to configuration to occur on the OMCI Gem port. When it is determined that the OLT sends the Assign Alloc-ID PLOAM message at startup, an OLT provisioning the type of ONT with which the communications were previously monitored can be configured to send the Assign Alloc-ID PLOAM message at startup. Otherwise, the OLT can be configured to refrain from sending the Assign Alloc-ID PLOAM message at startup. In other words, the PLOAM messaging sequence of the OLT can be modified to prevent OMCI provisioning failures.

The ONT Interoperability Parameters (OMCI parameters) are stored (310). In some implementations, the OMCI parameters are stored in the OMCI parameter database 214 of FIG. 2, or another appropriate data storage device that is accessible to the OLT when a new ONT is detected on the network. As discussed above, the OMCI parameters that are required by a particular set of ONTs can be indexed to keys of the database, such that the appropriate set of OMCI parameters for a particular ONT can be identified using one or more of a source identifier and/or a model identifier for the particular ONT. For example, the multiple different sets of OMCI parameters can be keyed to one or more of (i) a source identifier specifying a source of ONTs that require the given set of OMCI parameters for successful communications or (ii) a model identifier specifying a model number of ONTs that require the given set of OMCI parameters for successful communications.

The manner in which the OMCI parameters are stored can include multiple steps. For example, a determination can be made of whether each identified OMCI configuration (e.g., set of OMCI parameters) is required by multiple different models of ONTs provided by a same ONT source (e.g., manufacturer). In turn, each OMCI configuration can be keyed based on the determination whether the OMCI configuration is required by multiple different models of ONTs provided by the same ONT source. In response to determining that an OMCI configuration (e.g., a first OMCI configuration) is required by multiple different models of ONTs provided by the same ONT source, the OMCI configuration can be keyed to the source identifier of the ONTs. In response to determining that a different OMCI configuration (e.g., a second OMCI configuration) is required by a first model/type of ONT provided by the ONT source, but not required by a different model/type of ONT provided by the ONT source, the different OMCI configuration can be keyed to a model identifier of the first model/type of ONT, rather than the source identifier of the first model/type of ONT.

Figure 4:
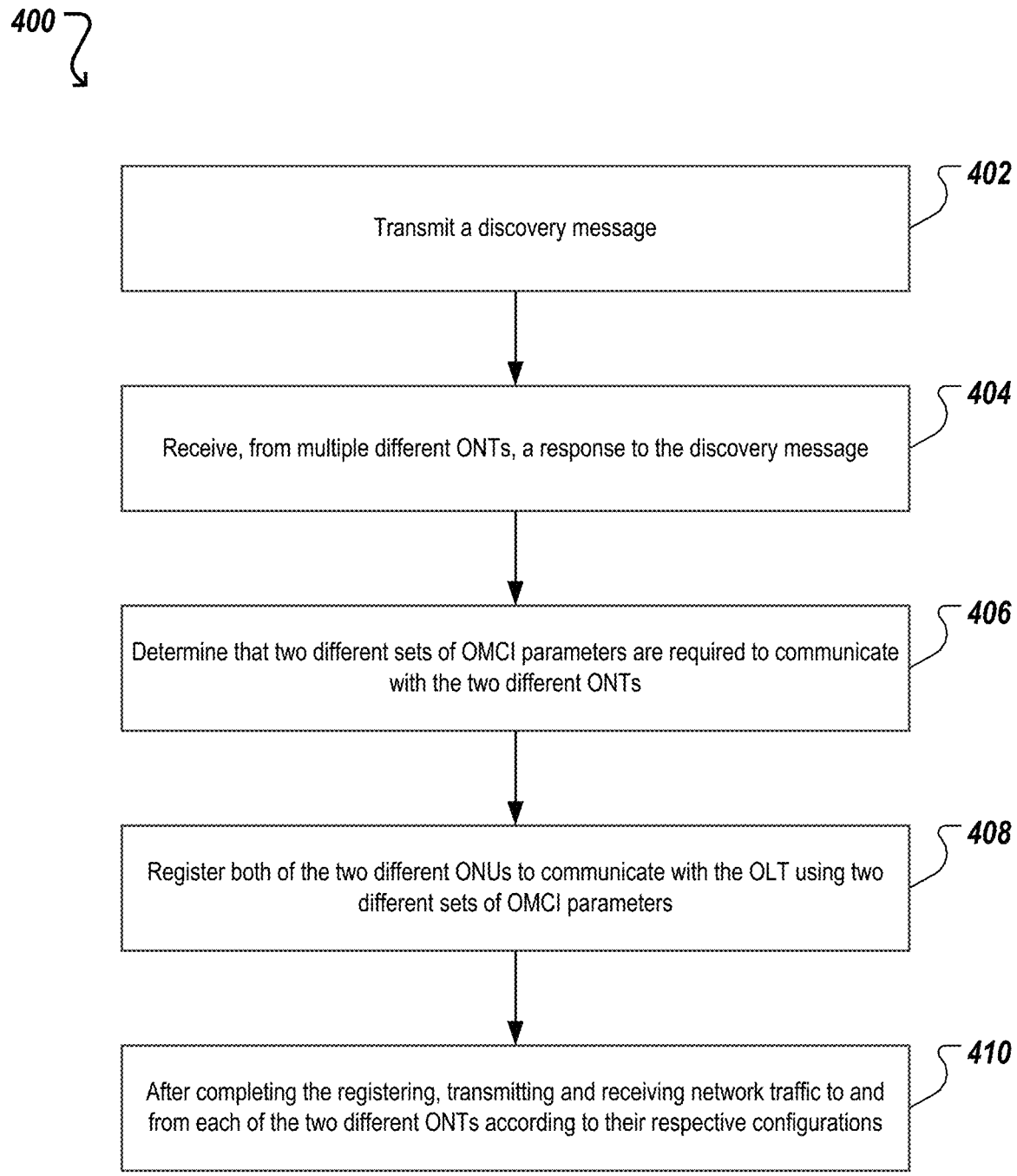
FIG. 4 is a flow chart of an example process of modifying an OLT to communicate with different ONTs that require different sets of OMCI parameters.

FIG. 4 is a flow chart of an example process 400 of modifying an Optical Line Terminal (OLT) to communicate with different Optical Network Terminals (ONTs) with different sets of ONT Management Control Interface (OMCI) parameters. Operations of the process 400 can be performed, for example, by the OLT 102 of FIG. 1 and/or one or more data processing apparatus. Operations of the process 400 can also be implemented as instructions that, upon execution by one or more data processing apparatus, cause the one or more data processing apparatus to perform the operation of the process 400.

A discovery message that triggers a response from ONTs is transmitted over a PON (402). In some implementations the ONTs are connected to a Passive Optical Network (PON), but are not registered with the OLT. The discovery message can be, for example, a PLOAM message that requests any new ONTs to identify themselves for registration with the OLT.

A response is received from each of two different ONTs connected to the PON (404). The response to the discovery message received from each given ONT contains one or more identifiers of the given ONT. As discussed above, the one or more identifiers can include one or more of a source identifier and/or a model identifier. The source identifier can correspond to, or represent, a source of the ONT that is responding. For example, the source identifier can be a name of the ONT manufacturer, or another alphanumeric string that corresponds to the manufacturer (or another source) of the ONT. The model identifier can be a character string that identifies a model/type of the responding ONT, or another character string that otherwise distinguishes the ONT from other ONTs that differ from the ONT.

A determination is made that two different sets of OMCI parameters are required to successfully provision, or otherwise communicate, with the two different ONTs (406). In some implementations, the determination is made by an OLT (or another data processing apparatus) based on the one or more different identifiers of the two different ONTs. For example, as discussed above, a source of the responding ONT can be determined based on the source identifier. For example, the source identifier can be compared to a mapping of source identifiers to sources, and the source of the ONT can be determined based on an entry in the mapping that is matched by the source identifier. In some implementations, the source identifier is compared to keys in a database to identify the matching key that corresponds to the source of the ONT, which can be used to identify the set of OMCI parameters that are required to be used to communicate with the responding ONT. As discussed above with reference to FIG. 2, the model identifier can be used in a similar manner to identify a matching key within a database, and identify the corresponding set of OMCI parameters that are indexed to the matching key, and that are required to be used to provision the responding ONT. When each of the two identifiers for the responding ONTs matches a different key in the database, and each of those different keys have different sets of OMCI parameter indexed thereto, the determination that the two different sets of OMCI parameters are required has been satisfied. Note that the responses by the ONTs to the discovery message will be offset in time, such that they are not necessarily received or processed at the same time.

Both of the two different ONTs are registered to communicate with the OLT using two different sets of OMCI parameters (408). For example, as discussed above, the OLT can be configured to transmit, within OMCI messages sent to each ONT, the OMCI parameter values that are respectively required by each of the responding ONTs.

The registration of the ONTs can include configuring, by the OLT and over the PON, communications between the OLT and a first ONT among the two different ONTs using a first set of OMCI parameters. For example, as discussed above with reference to FIG. 2, a first key in the database can be deemed to match an identifier of the first ONT, and the set of OMCI parameters that are indexed to that matching key can be used to generate the OMCI messages that are sent to the first ONT. The registration of the ONTs can also include configuring, by the OLT and over the PON, communications between the OLT and a second ONT among the two different ONTs using a second set of OMCI parameters that differs from the first set of OMCI parameters. For example, as discussed above with reference to FIG. 2, a second key in the database can be deemed to match an identifier of the second ONT, and the set of OMCI parameters that are indexed to that matching key can be used to generate the OMCI messages that are sent to the second ONT.

The configuration of the OLT can include the initiation of an OMCI state machine that manages configuration of communications between the OLT and the responding ONT. For example, the OMCI state machine can be modified based on the set of OMCI parameters that are keyed to the source of the ONT, and the state machine can ensure that the appropriate OMCI parameters are included in the OMCI messages as the provisioning of the communications with the ONT proceed.

After completing the registration of the ONTs, network traffic is transmitted to and/or received from each of the two different ONTs according to their respective configurations (410). Generally, network traffic differs from OMCI messages in that the network traffic carries the data requested by the end user and obtained from a network source that is upstream from the OLT. For example, network traffic would include voice, video, or other data that is requested by the end user and obtained from another end user, a website, or another online resource on the Internet. Meanwhile, the OMCI traffic includes messages exchanged between the OLT and the ONT to coordinate communications between the OLT and ONT, or otherwise monitor or maintain operation of the ONT. The transmitting and receiving can be performed, for example by the OLT 102 of FIG. 1.

Figure 5:
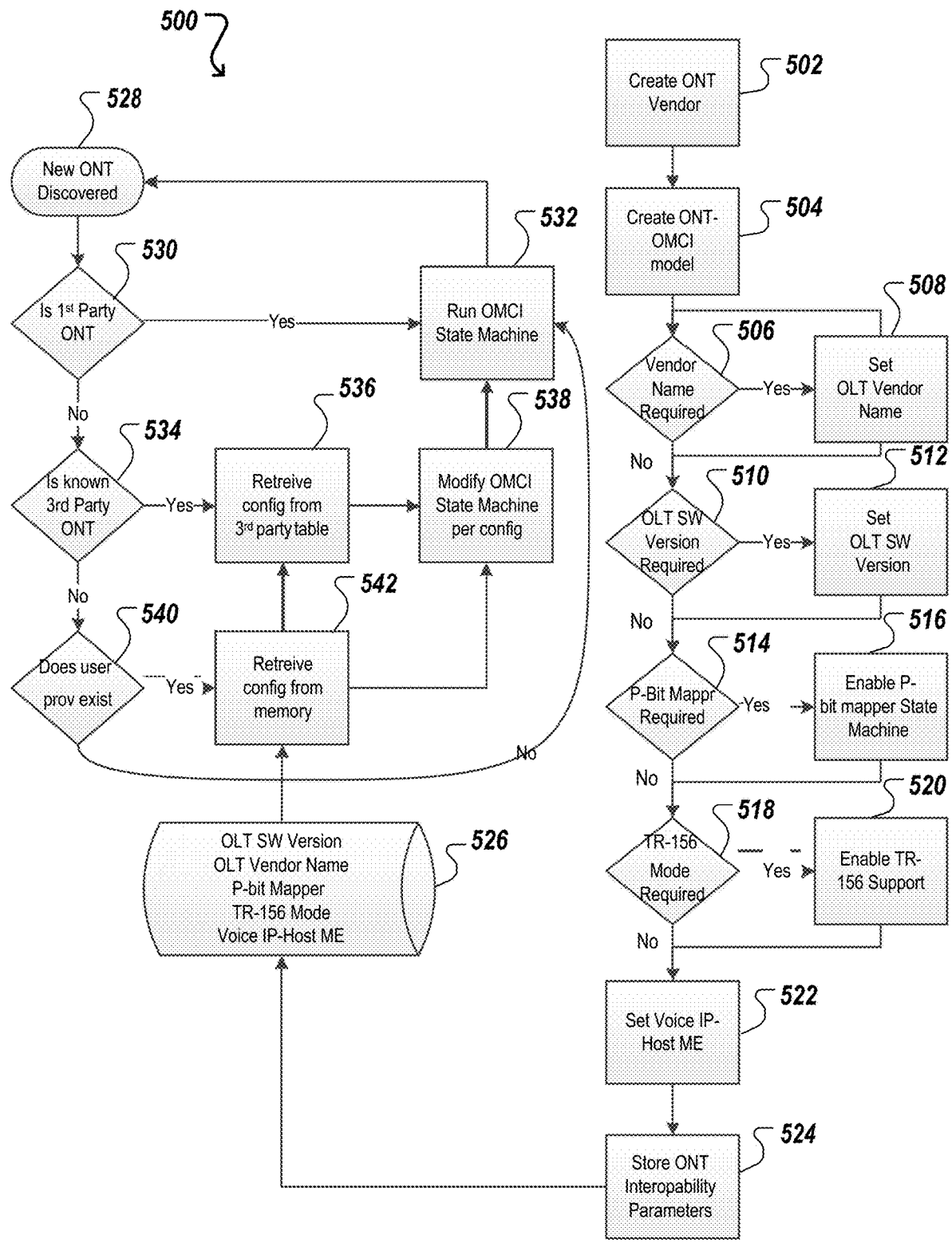
FIG. 5 is a flow chart of an example process of provisioning and modifying an OLT to communicate with different ONTs with different sets of OMCI parameters.

FIG. 5 is a flow chart of an example process 500 for provisioning and modifying an OLT to communicate with different ONTs with different sets of OMCI parameters. Operations of the process 500 can be performed, for example, by the OLT 102 of FIG. 1 and/or one or more data processing apparatus. Operations of the process 500 can also be implemented as instructions that, upon execution by one or more data processing apparatus, cause the one or more data processing apparatus to perform the operation of the process 500.

An ONT vendor container is created (502). The vendor container can be a logical container that includes sets of OMCI parameters for a particular ONT vendor. As discussed above with reference to FIG. 3, the vendor container can be used to store sets of OMCI parameters that are common to all ONTs provided by that vendor and/or ONT models.

An ONT-OMCI model is created (504). As discussed above with reference to FIG. 3, the ONT-OMCI model can be created to represent the OMCI model that is required for a particular model/type of ONT. For example, if a particular vendor uses different sets of OMCI parameters to provision different models/types of ONTs, then a different ONT-OMCI model could be created for those different models/types of ONTs. Each of the different ONT-OMCI models for a particular vendor can be included in the vendor container for that vendor.

To define the OMCI parameters for each ONT-OMCI model, a series of determinations can be made regarding the OMCI parameters that are required to successfully provision the model/type of ONT represented by the ONT-OMCI model. For example, a determination can be made whether the ONT requires the OLT vendor name to be included in at least some OMCI messages (e.g., OLT-G OMCI Messages) that are transmitted to the ONT, and/or whether the vendor name has already been set (506). When the vendor name is required and has not yet been set, the OLT vendor name is set as an OMCI parameter in the ONT-OMCI model (508). When the vendor name is not required or has already been set, the process 500 proceeds to determine whether another OMCI parameter is required and/or has already been set.

For example, the process 500 can proceed with a determination of whether the OLT software version needs to be set as an OMCI parameter (510). When the OLT software version is required by the ONT and has not already been set, the OLT software version is set in the ONT-OMCI model (512). When the OLT software version is not required or has already been set, the process 500 can proceed with another OMCI parameter determination.

For example, the process 500 can proceed with a determination of whether a P-Bit Mapper is required to be set for successful communications with the ONT and/or whether the P-Bit Mapper has already been set (514). When the P-Bit Mapper is required by the ONT and has not already been set, the P-Bit Mapper is set/enabled in the ONT-OMCI model (516). When the P-Bit Mapper is not required to be enabled or has already been set/enabled, the process 500 can proceed with another OMCI parameter determination.

For example, the process 500 can proceed with a determination of whether TR-156 mode is required to be set for successful communications with the ONT and/or whether the TR-156 mode has already been set (518). When the TR-156 mode is required by the ONT and has not already been set, the TR-156 mode is set/enabled in the ONT-OMCI model (520). When the TR-156 mode is not required to be enabled or has already been set/enabled, the process 500 can proceed with other OMCI parameter determinations or to another operation. For example, the process can continue with determinations of whether any of the parameters of Table 1 are required to be defined in the ONT-OMCI model.

When no further parameter determinations are required, the process 500 can continue to set the Voice IP-Host ME (522). If the Voice IP-Host ME required differs from a standard value used by the OLT, the ONT-OMCI model can be updated to the required Voice IP-Host ME in a manner similar to other parameters defined in the ONT-OMCI model.

The ONT Interoperability Parameters (OMCI parameters) are stored (524). The OMCI parameters can be stored, for example, in the database 526 in a manner similar to that discussed above. For example, if all ONTs for a particular vendor use the same set of OMCI parameters, a single ONT-OMCI model can be stored in the vendor container, and that ONT-OMCI model (e.g., representing and/or specifying the required set of OMCI parameters) can be indexed to a source identifier as discussed above with reference to FIG. 2.

When different ONT models/types from a same vendor require different sets of OMCI parameters, multiple different ONT-OMCI models can be stored. For example, a different ONT-OMCI model corresponding to each different set of OMCI parameters that are required by the different models/types of ONTs provided by the vendor can be stored in the vendor container. Furthermore, the different ONT-OMCI models can each be indexed to a key corresponding to the model identifier for each of the different models/types of ONTs that require different sets of OMCI parameters.

When a new ONT is discovered on the PON (528), the response to the discovery message can trigger a set of inquiries to determine which set of OMCI parameters will be used to provision the new ONT. For example, one inquiry can determine whether the ONT is a first party ONT based on an analysis of the response to the discovery message (530). More specifically, the response to the discovery message can be analyzed to identify a source identifier for the ONT. When the source identifier of the ONT matches a source identifier of the OLT, the ONT is considered a first party ONT because the OLT and the ONT are deemed to be from a same source. In this situation, the OLT can be assumed to be pre-configured (e.g., hardcoded) to use the same set of OMCI parameters as the ONT, such that no reconfiguration is required, and the OMCI state machine can be run as pre-configured (532).

When the ONT is not deemed to be a first party ONT (e.g., because the source identifier of the ONT does not match the source identifier of the OLT), another inquiry can be performed to determine whether the ONT is a known third party ONT. A known third party ONT is a responding ONT having a source that differs from the source of the OLT, but for which an ONT-OMCI model exists (e.g., as created using operations 502-524).

In response to determining that the source of the responding ONT differs from the source of the OLT (e.g., based on a comparison of source identifiers), the database 526 can be queried to retrieve, from the database 526, the set of OMCI parameters (e.g., as defined in the ONT-OMCI model) that are keyed to the source (and/or model) of the responding ONT (536). When a set of OMCI parameters are successfully retrieved from the database (e.g., a third party ONT table in the database), the OMCI State Machine can initiated based on the source of the responding ONT. For example, the OMCI State Machine can be reconfigured using the set of OMCI parameters retrieved from the database (538), and the reconfigured OMCI State Machine can be run to manage provisioning of the third party ONT (532).

When the ONT has not been identified as a first party ONT or a third party ONT based on the inquiries above, a determination can be made whether there exists a user-specified (e.g., locally created and stored) set of OMCI parameters that are required to provision the ONT (540).

In some implementations, the user of the OLT can manually create an ONT-OMCI model for an ONT that may not be initially supported by the OLT. For example, in response to determining that a source of the responding ONT differs from a source of the OLT and (ii) the database does not include a set of OMCI parameters for the responding ONT, entry of a set of OMCI parameters for the responding ONT can be enabled. In this example, the user can manually specify the set of OMCI parameters required to successfully provision the ONT, and that set of OMCI parameters can be stored in memory, for example, as a user-created ONT-OMCI model for that ONT. Note that the user-created ONT-OMCI model can be created prior to detecting the non-supported ONT on the PON.

Once the user-created ONT-OMCI model has been created, it can be retrieved from the memory (542) whenever that type of ONT is detected, and the OMCI State Machine can be initiated to manage provisioning of the responding ONT. For example, the OMCI State Machine can be reconfigured/modified based on the user-created ONT-OMCI model that was created based on the set of OMCI parameters input for the responding ONT (538). In turn, the reconfigured/modified OMCI State Machine can be run to manage provisioning of the responding ONT.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of enabling communications between an Optical Line Terminal ("OLT") and different Optical Network Units (ONTs) having different ONT Management Control Interface configurations comprising:
   transmitting, by an OLT, a discovery message that triggers a response from ONTs that (i) are connected to a Passive Optical Network (PON), but (ii) are not registered with the OLT;
   receiving, from two different ONTs connected to the PON, a response to the discovery message that contains one or more identifiers of the ONT;
   determining, by the OLT and based on the one or more identifiers of the two different ONTs, that two different sets of ONT Management Control Interface (OMCI) parameters are required to communicate with the two different ONTs;
   registering, by the OLT, both of the two different ONTs to communicate with the OLT using two different sets of OMCI parameters, including:
      configuring, by the OLT and over the PON, communications between the OLT and a first ONT among the two different ONTs using a first set of OMCI parameters; and
      configuring, by the OLT and over the PON, communications between the OLT and a second ONT among the two different ONTs using a second set of OMCI parameters that differs from the first set of OMCI parameters; and
   after completing the registering, transmitting and receiving, by the OLT, network traffic to and from each of the two different ONTs according to their respective configurations.

2. The method of claim 1, further comprising:
   generating multiple different sets of OMCI parameters for multiple different ONTs that require different sets of OMCI parameters to successfully communicate with the OLT;
   storing, in a database accessible to the OLT, the multiple different sets of OMCI parameters, wherein each given set of OMCI parameters is keyed to one or more of (i) a source identifier specifying a source of ONTs that require the given set of OMCI parameters for successful communications or (ii) a model identifier specifying a model number of ONTs that require the given set of OMCI parameters for successful communications.

3. The method of claim 2, further comprising:
   monitoring communications between multiple different types of ONTs and OLTs that are successfully communicating; wherein, generating multiple different sets of OMCI parameters comprises for each different type of ONT includes:
      determining, based on the monitored communications, one or more OMCI parameters that are required for successful communication with a particular type of ONT; and
      generating, for the particular type of ONT, an OMCI configuration that specifies the one or more parameters that are required for successful communication with the particular type of ONT.

4. The method of claim 3, further comprising:
   determining whether each OMCI configuration is required by multiple different models of ONTs provided by a same ONT source; and
   keying, in the database accessible to the OLT, the OMCI configuration based on the determination whether the OMCI configuration is required by multiple different models of ONTs provided by the same ONT source, including:
      keying a first OMCI configuration to a first source identifier in response to the determination that the first OMCI configuration is required by multiple different models of ONTs provided by a first ONT source; and
      keying a second OMCI configuration to a model identifier of a particular ONT model, rather than a source identifier of the particular ONT model, in response to the determination that the second OMCI configuration is required by the particular ONT model, but not a different ONT model provided by the source of the particular ONT model.

5. The method of claim 3, wherein determining one or more OMCI parameters that are required for successful communication and operation with the particular type of ONT comprises:
   determining whether a source name is required to be specified during OMCI provisioning to achieve a successful provisioning of the ONT to allow the data, voice and video services to operate with the particular type of ONT;
   determining whether a software version is required to be specified during OMCI provisioning to achieve a successful provisioning of the ONT to allow the data, voice and video services to operate with the particular type of ONT;
   determining whether a p-bit mapper is required during OMCI provisioning to achieve a successful provisioning of the ONT to allow the data, voice and video services to operate with the particular type of ONT;
   determining whether TR-156 support is required during OMCI provisioning to achieve a successful provisioning of the ONT to allow the data, voice and video services to operate with the particular type of ONT; and
   determining a Voice IP-Host ME setting that is required during OMCI provisioning to achieve a successful provisioning of the ONT to allow the data, voice and video services to operate with the particular type of ONT.

6. The method of claim 5, further comprising determining whether a PLOAM messaging sequence of the OLT is required to be modified based on a determination of whether the ONT requires an Assign Alloc-ID PLOAM message at startup.

7. The method of claim 2, further comprising:
   for each responding ONT among the two different ONTs;
      determining, by the OLT and based on the one or more identifiers of the ONT, a source of the responding ONT;
      initiating, by the OLT and based on the source of the responding ONT, an OMCI state machine to manage configuration of communications between the OLT and the responding ONT.

8. The method of claim 7, further comprising:
   in response to determining that a source of the responding ONT differs from a source of the OLT, retrieving, from the database, the set of OMCI parameters that are keyed to the source of the responding ONT; and modifying the OMCI state machine based on the set of OMCI parameters that are keyed to the source of the responding ONT.

9. The method of claim 8, further comprising:
in response to determining that (i) a source of the responding ONT differs from a source of the OLT and (ii) the database does not include a set of OMCI parameters for the responding ONT, enabling entry of a set of OMCI parameters for the responding ONT; and modifying the OMCI state machine based on the set of OMCI parameters input for the responding ONT.

10. An Optical Line Terminal ("OLT"), comprising:
a Passive Optical Network ("PON") communications interface;
one or more data processing apparatus; and
one or more memory devices, the one or more data processing apparatus being configured to execute instructions that cause the one or more data processing apparatus to perform operations comprising:
transmitting a discovery message that triggers a response from one or more ONTs that (i) are connected to a Passive Optical Network (PON), but (ii) are not registered with the OLT;
receiving, from each of two different ONTs connected to the PON, a response to the discovery message that contains one or more identifiers of the ONT;
determining, based on the one or more identifiers of the two different ONTs, that two different sets of ONT Management Control Interface (OMCI) parameters are required to communicate with the two different ONTs;
registering both of the two different ONTs to communicate with the OLT using two different sets of OMCI parameters, including:
configuring, over the PON, communications between the OLT and a first ONT among the two different ONTs using a first set of OMCI parameters; and
configuring, over the PON, communications between the OLT and a second ONT among the two different ONTs using a second set of OMCI parameters that differs from the first set of OMCI parameters; and
after completing the registering, transmitting, by the OLT, network traffic to each of the two different ONTs according to their respective configurations.

11. The Optical Line Terminal of claim 10, wherein the instructions cause the one or more data processing apparatus to perform operations comprising:
generating multiple different sets of OMCI parameters for multiple different ONTs that require different sets of OMCI parameters to successfully communicate with the OLT;
storing, in a database accessible to the OLT, the multiple different sets of OMCI parameters, wherein each given set of OMCI parameters is keyed to one or more of (i) a source identifier specifying a source of ONTs that require the given set of OMCI parameters for successful communications or (ii) a model identifier specifying a model number of ONTs that require the given set of OMCI parameters for successful communications.

12. The Optical Line Terminal of claim 11, wherein the instructions cause the one or more data processing apparatus to perform operations comprising:
monitoring communications between multiple different types of ONTs and OLTs that are successfully communicating; wherein, generating multiple different sets of OMCI parameters comprises for each different type of ONT includes:
determining, based on the monitored communications, one or more OMCI parameters that are required for successful communication with a particular type of ONT; and
generating, for the particular type of ONT, an OMCI configuration that specifies the one or more parameters that are required for successful communication with the particular type of ONT.

13. The Optical Line Terminal of claim 12, wherein the instructions cause the one or more data processing apparatus to perform operations comprising:
determining whether each OMCI configuration is required by multiple different models of ONTs provided by a same ONT source; and
keying, in the database accessible to the OLT, the OMCI configuration based on the determination whether the OMCI configuration is required by multiple different models of ONTs provided by the same ONT source, including:
keying a first OMCI configuration to a first source identifier in response to the determination that the first OMCI configuration is required by multiple different models of ONTs provided by a first ONT source; and
keying a second OMCI configuration to a model identifier of a particular ONT model, rather than a source identifier of the particular ONT model, in response to the determination that the second OMCI configuration is required by the particular ONT model, but not a different ONT model provided by the source of the particular ONT model.

14. The Optical Line Terminal of claim 12, wherein determining one or more OMCI parameters that are required for successful communication and operation with the particular type of ONT comprises:
determining whether a source name is required to be specified during OMCI provisioning to achieve a successful provisioning of the ONT to allow the data, voice and video services to operate with the particular type of ONT;
determining whether a software version is required to be specified during OMCI provisioning to achieve a successful provisioning of the ONT to allow the data, voice and video services to operate with the particular type of ONT;
determining whether a p-bit mapper is required during OMCI provisioning to achieve a successful provisioning of the ONT to allow the data, voice and video services to operate with the particular type of ONT;
determining whether TR-156 support is required during OMCI provisioning to achieve a successful provisioning of the ONT to allow the data, voice and video services to operate with the particular type of ONT; and
determining a Voice IP-Host ME setting that is required during OMCI provisioning to achieve a successful provisioning of the ONT to allow the data, voice and video services to operate with the particular type of ONT.

15. The Optical Line Terminal of claim 14, wherein the instructions cause the one or more data processing apparatus to perform operations comprising determining whether a PLOAM messaging sequence of the OLT is required to be modified based on a determination of whether the ONT requires an Assign Alloc-ID PLOAM message at startup.

16. The Optical Line Terminal of claim 11, wherein the instructions cause the one or more data processing apparatus to perform operations comprising:

for each responding ONT among the two different ONTs;
determining, by the OLT and based on the one or more identifiers of the ONT, a source of the responding ONT;
initiating, by the OLT and based on the source of the responding ONT, an OMCI state machine to manage configuration of communications between the OLT and the responding ONT.

17. The Optical Line Terminal of claim 16, wherein the instructions cause the one or more data processing apparatus to perform operations comprising:

in response to determining that a source of the responding ONT differs from a source of the OLT, retrieving, from the database, the set of OMCI parameters that are keyed to the source of the responding ONT; and
modifying the OMCI state machine based on the set of OMCI parameters that are keyed to the source of the responding ONT.

18. The Optical Line Terminal of claim 17, wherein the instructions cause the one or more data processing apparatus to perform operations comprising:

in response to determining that (i) a source of the responding ONT differs from a source of the OLT and (ii) the database does not include a set of OMCI parameters for the responding ONT, enabling entry of a set of OMCI parameters for the responding ONT; and
modifying the OMCI state machine based on the set of OMCI parameters input for the responding ONT.

19. A non-transitory computer storage medium storing instructions that when executed by one or more data processing apparatus cause the one or more data processing apparatus to perform operations comprising:

transmitting a discovery message that triggers a response from one or more ONTs that (i) are connected to a Passive Optical Network (PON), but (ii) are not registered with an Optical Line Terminal ("OLT");
receiving, from each of two different ONTs connected to the PON, a response to the discovery message that contains one or more identifiers of the ONT;
determining, based on the one or more identifiers of the two different ONTs, that two different sets of ONT Management Control Interface (OMCI) parameters are required to communicate with the two different ONTs;
registering both of the two different ONTs to communicate with the OLT using two different sets of OMCI parameters, including:
configuring, over the PON, communications between the OLT and a first ONT among the two different ONTs using a first set of OMCI parameters; and
configuring, over the PON, communications between the OLT and a second ONT among the two different ONTs using a second set of OMCI parameters that differs from the first set of OMCI parameters; and
after completing the registering, transmitting, by the OLT, network traffic to each of the two different ONTs according to their respective configurations.

20. The non-transitory computer storage medium of claim 19, wherein the instructions cause the one or more data processing apparatus to perform operations comprising:

generating multiple different sets of OMCI parameters for multiple different ONTs that require different sets of OMCI parameters to successfully communicate with the OLT;
storing, in a database accessible to the OLT, the multiple different sets of OMCI parameters, wherein each given set of OMCI parameters is keyed to one or more of (i) a source identifier specifying a source of ONTs that require the given set of OMCI parameters for successful communications or (ii) a model identifier specifying a model number of ONTs that require the given set of OMCI parameters for successful communications.

* * * * *